US011623676B2

(12) United States Patent
Hall et al.

(10) Patent No.: US 11,623,676 B2
(45) Date of Patent: Apr. 11, 2023

(54) SEPARABLE TRANSPORT CARTS FOR SECTIONAL DRAIN CLEANER

(71) Applicant: Ridge Tool Company, Elyria, OH (US)

(72) Inventors: Katherine Hall, North Ridgeville, OH (US); Glen R. Chartier, Avon Lake, OH (US); Harald Krondorfer, Aurora, OH (US); Scott Kruepke, Valley City, OH (US); Robert Skrjanc, Lorain, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 17/084,784

(22) Filed: Oct. 30, 2020

(65) Prior Publication Data

US 2021/0053599 A1 Feb. 25, 2021

Related U.S. Application Data

(63) Continuation of application No. 16/436,988, filed on Jun. 11, 2019, now Pat. No. 10,858,022.

(60) Provisional application No. 62/699,318, filed on Jul. 17, 2018.

(51) Int. Cl.
*B62B 1/22* (2006.01)
*B62B 1/00* (2006.01)
*B62B 1/26* (2006.01)

(52) U.S. Cl.
CPC ............. *B62B 1/22* (2013.01); *B62B 1/008* (2013.01); *B62B 1/26* (2013.01)

(58) Field of Classification Search
CPC .. B62B 1/20; B62B 1/208; B62B 1/22; B62B 1/24; B62B 1/008
See application file for complete search history.

(56) References Cited

U.S. PATENT DOCUMENTS

| D150,797 | S | * | 8/1948 | Lane | ........................... D6/682.2 |
| 2,860,887 | A | * | 11/1958 | Stewart | .................. B63H 20/36 |
| | | | | | 280/651 |
| 3,382,988 | A | * | 5/1968 | O'Reilly | ............ E04F 21/1822 |
| | | | | | 254/387 |

(Continued)

FOREIGN PATENT DOCUMENTS

CN 201923584 U 8/2011
CN 206344837 U 7/2017

OTHER PUBLICATIONS

CN Search Report dated Jun. 18, 2021; Application No. 2019106414056; 6 pages.

(Continued)

*Primary Examiner* — Erez Gurari
(74) *Attorney, Agent, or Firm* — Mark E. Bandy; Rankin Hill & Clark, LLP

(57) ABSTRACT

Wheeled transport carts are described which are configured for transporting drain cleaning equipment such as drain cleaning machines and drain cleaning cable. The carts include engagement provisions that enable a drain cleaning machine to be affixed to the cart and preclude unintended separation from the cart during use or transport. The engagement provisions also enable the drain cleaning machine to be quickly and easily separated from the cart. Also described are methods of transporting such equipment using the carts. In addition, systems of the cart(s) with various equipment are described.

16 Claims, 15 Drawing Sheets

(56) References Cited

U.S. PATENT DOCUMENTS

| | | | |
|---|---|---|---|
| 3,804,432 A * | 4/1974 | Lehrman | B62B 1/12 280/654 |
| 4,050,671 A * | 9/1977 | Coleman | B62B 3/108 254/7 R |
| 4,205,937 A * | 6/1980 | Fawley | B62B 1/264 222/3 |
| 4,275,894 A * | 6/1981 | Mortenson | B62B 1/14 280/654 |
| 4,611,823 A | 9/1986 | Haas | |
| 4,632,627 A | 12/1986 | Swallows | |
| 5,087,013 A | 2/1992 | Gress et al. | |
| 5,123,666 A * | 6/1992 | Moore | B62B 1/14 D34/27 |
| 5,518,356 A * | 5/1996 | Krawczyk | B62B 1/14 414/490 |
| 5,577,745 A * | 11/1996 | Birk | B62B 1/262 280/47.28 |
| 5,658,118 A * | 8/1997 | Luca | B62B 5/06 414/444 |
| 5,863,052 A | 1/1999 | Roman | |
| 5,913,527 A * | 6/1999 | Hailston | B62B 1/14 280/47.24 |
| 6,135,466 A * | 10/2000 | Irwin | B62B 1/14 280/47.27 |
| 6,227,789 B1 * | 5/2001 | Williamson | B62B 1/145 414/490 |
| 6,554,300 B1 | 4/2003 | Ziolkowski | |
| 6,715,979 B1 | 4/2004 | Theising et al. | |
| 6,824,151 B1 * | 11/2004 | Tucei, Jr. | B62B 3/102 280/47.35 |
| 6,962,354 B1 * | 11/2005 | Miller | A01K 97/08 280/47.26 |
| 7,819,407 B1 * | 10/2010 | Charitun | B62B 1/12 280/652 |
| 8,096,519 B2 | 1/2012 | Tam et al. | |
| 8,366,124 B1 * | 2/2013 | Caldwell | B62B 1/20 280/30 |
| 8,475,109 B2 | 7/2013 | Torrison et al. | |
| 8,602,425 B1 * | 12/2013 | Meier, III | B62B 1/264 280/47.27 |
| 9,233,700 B1 * | 1/2016 | Elden | B62B 1/266 |
| 9,370,835 B2 | 6/2016 | Kundracik et al. | |
| 9,370,969 B2 | 6/2016 | Kroening et al. | |
| 9,371,655 B1 * | 6/2016 | Davis | E04F 21/0007 |
| 9,771,091 B1 * | 9/2017 | Gonzalez-Martinez | B62B 1/26 |
| 9,861,087 B1 | 1/2018 | Arrazola et al. | |
| 10,137,920 B1 * | 11/2018 | Bolden | B62B 5/06 |
| 2003/0085552 A1 | 5/2003 | Shapiro | |
| 2005/0006862 A1 | 1/2005 | Courson | |
| 2005/0104308 A1 * | 5/2005 | Barnes | B62B 1/14 280/638 |
| 2007/0063467 A1 * | 3/2007 | Hurtgam | B62B 1/14 280/47.24 |
| 2007/0090615 A1 * | 4/2007 | Tan | B62B 1/26 280/47.17 |
| 2008/0136131 A1 * | 6/2008 | Sorg | E04G 21/04 280/47.18 |
| 2009/0230646 A1 * | 9/2009 | Chapman | B62B 1/12 280/47.19 |
| 2012/0049474 A1 * | 3/2012 | Del Rosario | B62B 1/008 248/304 |
| 2012/1087357 | 7/2012 | Jordan et al. | |
| 2013/0223971 A1 * | 8/2013 | Grace, IV | B62B 1/14 414/809 |
| 2014/0375181 A1 * | 12/2014 | Bar-Erez | B65D 25/22 312/111 |
| 2016/0200380 A1 | 7/2016 | Lu et al. | |
| 2017/0341665 A1 * | 11/2017 | Cook | B62B 1/125 |
| 2018/0132447 A1 * | 5/2018 | McGeehan | A01K 1/0245 |
| 2020/0023873 A1 * | 1/2020 | Chartier | B62B 1/26 |

OTHER PUBLICATIONS

Office Action and Search Report dated Feb. 28, 2022; Application No. 201910641405.6; 10 pages.

Office Action and Search Report dated Nov. 2, 2022; Application No. 201910641405.6; 13 pages.

* cited by examiner

SEPARABLE TRANSPORT CARTS FOR SECTIONAL DRAIN CLEANER

CROSS REFERENCES TO RELATED APPLICATIONS

This application is a continuation application and claims priority upon U.S. non-provisional application Ser. No. 16/436,988 filed on Jun. 11, 2019, which claims priority from U.S. provisional application Ser. No. 62/699,318 filed on Jul. 17, 2018.

FIELD

The present subject matter relates to transport carts for drain cleaning equipment and in particular carts that can be selectively and releasably engaged with drain cleaning equipment for secure and easy transport to and from a jobsite. The present subject matter also relates to systems and related methods utilizing the carts.

BACKGROUND

In the drain cleaning market, some end users prefer the ability to wheel a drain cleaning machine to the drain to be cleared to reduce the manual effort otherwise associated with lifting or carrying the unit. In many applications, the drain cleaning professional would prefer to operate the drain cleaning machine with the machine remaining on the transport cart. However, some jobsites do not accommodate the space required for the wheeled transport cart frame.

Accordingly, a need exists for a transport cart that enables a drain cleaning machine and/or related equipment to be quickly and easily engaged with, transported on the cart, and optionally disengaged from the cart. A need also exists for a transport cart configured such that a drain cleaning machine can be used while engaged with the cart.

SUMMARY

The difficulties and drawbacks associated with previous approaches are addressed in the present subject matter as follows.

In one aspect, the present subject matter provides a transport cart comprising a frame defining a proximal end and an opposite distal end. The frame defines a frame longitudinal axis extending between the proximal end and the distal end. The frame includes at least one wheel rotatably secured to the frame adjacent the distal end. The transport cart also comprises engagement provisions secured to the frame. The engagement provisions include (i) a first member adjacent the distal end of the frame, the first member including a first receiving slot defining a first longitudinal axis, and (ii) a second member between the proximal end of the frame and the first member. The second member includes a second receiving slot defining a second longitudinal axis, wherein both the first receiving slot and the second receiving slot are accessible from the proximal end of the frame.

In another aspect, the present subject matter provides a transport cart comprising a frame defining a proximal end and an opposite distal end. The frame defines a longitudinal axis extending between the proximal end and the distal end. The frame includes at least one wheel rotatably secured to the frame adjacent the distal end. The transport cart also comprises a kickstand assembly secured to the frame. The kickstand assembly includes a kickstand positionable between a storage position and a use position. Upon orienting the frame to rest upon an underlying surface, and positioning the kickstand to the use position, the at least one wheel is free from contact with the underlying surface.

In still another aspect, the present subject matter provides a transport cart comprising a frame defining a proximal end and an opposite distal end. The frame defines a longitudinal axis extending between the proximal end and the distal end. The frame includes at least one wheel rotatably secured to the frame adjacent the distal end. The transport cart also comprises a stairs support bracket secured to the frame and positioned such that the bracket extends tangential or nearly tangential to the at least one wheel.

In yet another aspect, the present subject matter provides a method of transporting a drain cleaning machine. The method comprises providing a transport cart including (a) a frame defining a proximal end and an opposite distal end, the frame defining a longitudinal axis extending between the proximal end and the distal end, the frame including at least one wheel rotatably secured to the frame adjacent the distal end, and (b) engagement provisions secured to the frame. The engagement provisions includes (i) a first member adjacent the distal end of the frame defining a first receiving slot having a longitudinal axis, and (ii) a second member between the proximal end of the frame and the first member. The second member defines a second receiving slot having a longitudinal axis, wherein both of the first receiving slot and the second receiving slot are accessible from the proximal end of the frame. The method also comprises aligning a first portion of a frame of the drain cleaning machine with the first receiving slot. The method additionally comprises aligning a second portion of the frame of the drain cleaning machine with the second receiving slot. The method further comprises moving the drain cleaning machine relative to the cart such that the frame of the drain cleaning machine is positioned in both of the first receiving slot and the second receiving slot.

In yet another aspect, the present subject matter provides a system comprising a drain cleaning machine, and a transport cart including a frame defining a proximal end and an opposite distal end. The frame defines a longitudinal axis extending between the proximal end and the distal end. The frame includes at least one wheel rotatably secured to the frame adjacent the distal end, and engagement provisions secured to the frame. The engagement provisions include (i) a first member adjacent the distal end of the frame defining a first receiving slot having a longitudinal axis, and (ii) a second member between the proximal end of the frame and the first member. The second member defines a second receiving slot having a longitudinal axis, wherein both of the first receiving slot and the second receiving slot are accessible from the proximal end of the frame.

In another aspect, the present subject matter provides a system comprising a drain cleaning machine, and a transport cart including a frame defining a proximal end and an opposite distal end. The frame defines a longitudinal axis extending between the proximal end and the distal end. The frame includes at least one wheel rotatably secured to the frame adjacent the distal end, and a kickstand assembly secured to the frame. The kickstand assembly includes a kickstand positionable between a storage position and a use position, wherein upon orienting the frame to rest upon an underlying surface, and positioning the kickstand to the use position, the at least one wheel is free from contact with the underlying surface.

In still another aspect, the present subject matter provides a system comprising a drain cleaning machine and a transport cart. The transport cart includes a frame defining a proximal end and an opposite distal end. The frame defines a longitudinal axis extending between the proximal end and the distal end. The frame includes at least one wheel rotatably secured to the frame adjacent the distal end. The transport cart also includes a stairs support bracket secured to the frame and positioned such that the bracket extends tangential or nearly tangential to the at least one wheel.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter enables easy and convenient transport of a drain cleaning machine and drain cleaning equipment such as drain cleaning cable to and/or from a jobsite. This reduces the number of trips required by the end user while setting up a drain cleaning job. By allowing the transport of the cable or related equipment with the machine in a single wheeled trip, the setup time at the jobsite is significantly reduced. In addition, the ability to quickly attach or remove the machine from the wheeled transport cart is beneficial in creating greater flexibility and efficiency for the end user to separate the drain cleaning machine from the cart when the need arises, or to reconnect when transporting.

Figure 1:
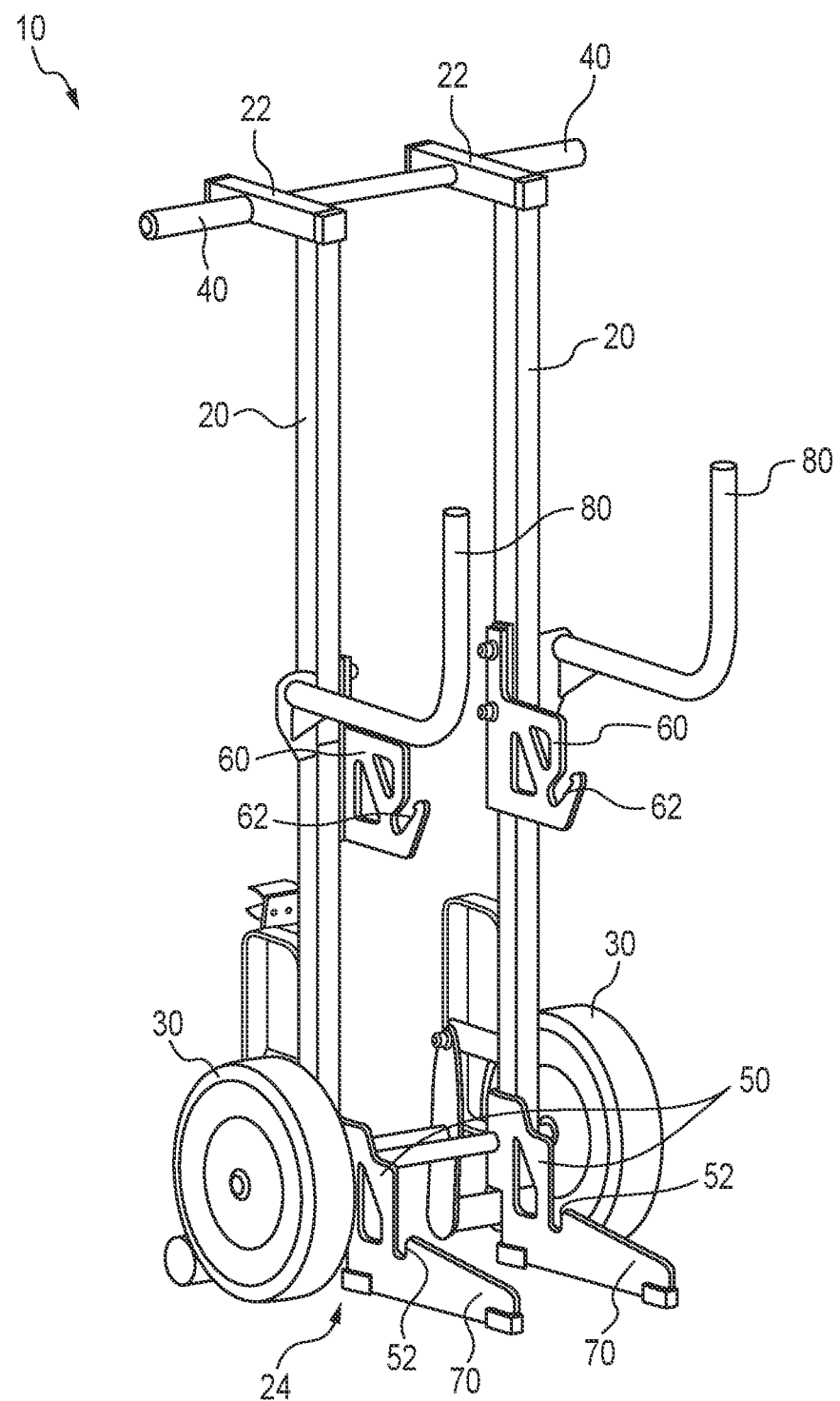
FIG. 1 is a front perspective view of an embodiment of a transport cart in accordance with the present subject matter.

The present subject matter provides transport carts which address the various problems and difficulties associated with currently known carts and wheeled drain cleaning machines. Referring to FIG. 1, an embodiment of a transport cart 10 in accordance with the present subject matter is shown. The transport cart 10 comprises a frame 20 defining a proximal end 22 and an opposite distal end 24. The cart 10 also comprises at least two wheels 30 rotatably secured to the frame 20 and adjacent the distal end 24 of the frame 20. Although the carts described herein utilize a total of two wheels, the present subject matter includes the use of more than two wheels such as three, four, or more wheels. It is also contemplated that the carts could utilize a single wheel. The cart 10 typically also comprises one or more handles 40 secured to the frame 20. A wide array of configurations and locations can be utilized for the handles. In the embodiment shown in FIG. 1, the handles 40 are secured adjacent the proximal end 22 of the frame 20 and extend laterally outward from the frame 20.

Figure 2:
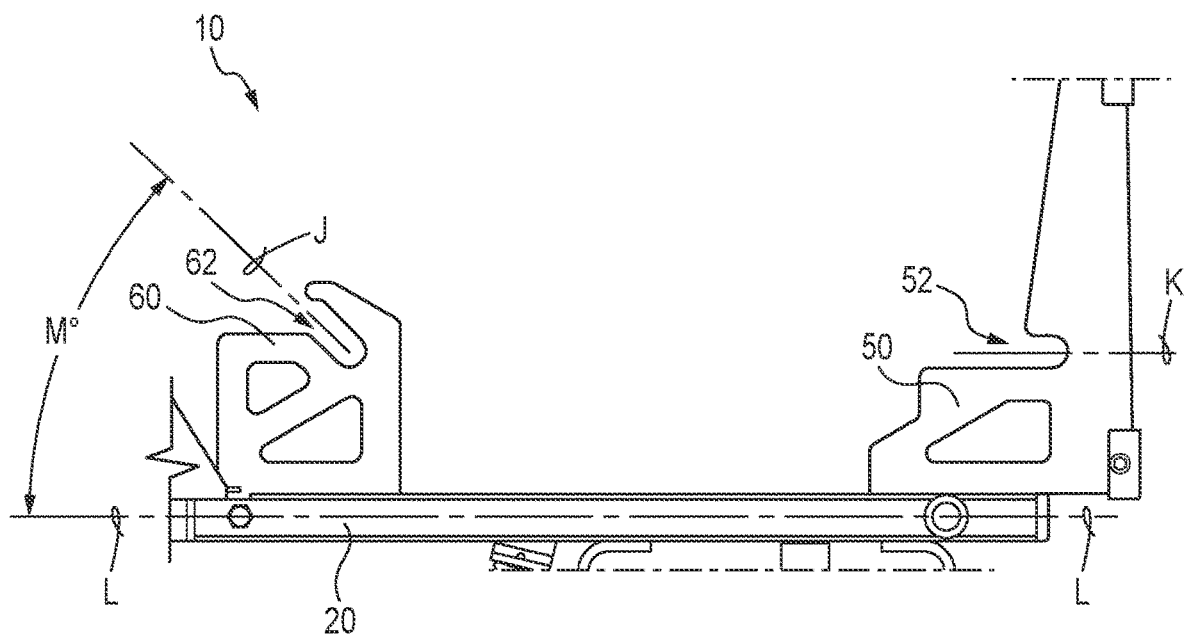
FIG. 2 is a side elevational view of a portion of the transport cart of FIG. 1.

The present subject matter provides engagement provisions on the cart that allow a drain cleaning machine to fit into place and be held in position on the cart via the configuration and profile of the engagement provisions. The engagement provisions require manual effort to separate the drain cleaning machine from the cart; but preclude unintended separation during use or transit. In one embodiment, the engagement provisions include a particular slot geometry aligning with the front of the cart in which the geometry is straightly-oriented. The engagement provisions also include a particular slot geometry at the rear of the cart which is angularly-oriented. This variation in profiles between front and rear improves the ease of use for the end user by requiring specific locating of the drain cleaning machine at only one end of the cart and allowing placement of the drain cleaning machine at the opposite end of the cart to be less restrictive. FIGS. 1 and 2 depict an example of engagement provisions that include such geometry that effectively holds a drain cleaning machine in place during loading, unloading, transport, and use.

Figure 2A:
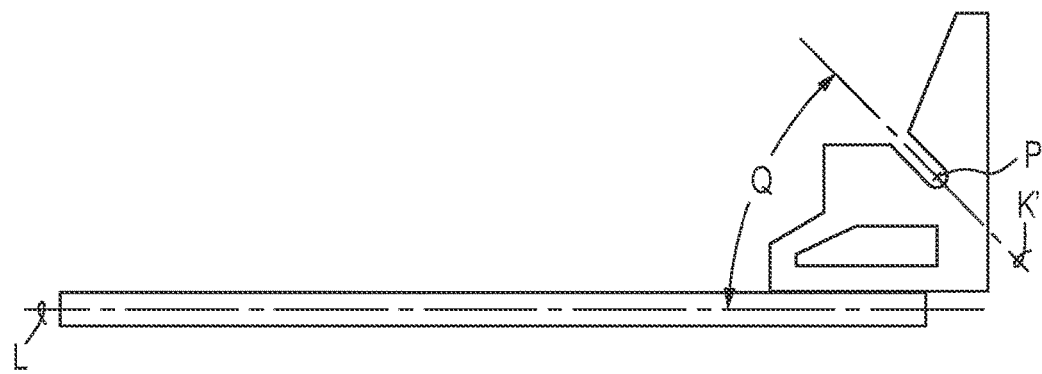
FIG. 2A is another side elevational view of a portion of the transport cart of FIG. 1.

Referring further to FIGS. 1 and 2, in the depicted cart 10, the engagement provisions include one or more first engagement members 50 adjacent the distal end 24 of the frame 20. Typically, the cart 10 utilizes a pair (see FIG. 1) of the first engagement members 50. Each of the first engagement members 50 (FIG. 1) include a first receiving slot 52 (FIG. 2) which defines a longitudinal axis K oriented parallel, or substantially parallel, to the longitudinal axis of the cart 10, which is depicted as longitudinal axis L in FIG. 2. The engagement provisions also include one or more second engagement members 60 (FIG. 1), located between the proximal end 22 of the frame 20 and the first engagement member(s) 50. Typically, the cart 10 utilizes a pair (see FIG. 1) of the second engagement members 60. Each of the second engagement members 60 include a second receiving slot 62, each of which (slots 62) defines an elongated axis J which is oriented at an acute angle M (see FIG. 2) with respect to the longitudinal axis L of the cart 10. Typically, angle M is within a range of from 1° to 80°, more particularly from 10° to 70°, more particularly from 20° to 60°, more particularly from 30° to 55°, and more particularly from 40° to 50°. In certain versions, angle M can be 45°. The present subject matter also includes orientations of a longitudinal axis K' (see FIG. 2A) of the first receiving slot 52 being nonparallel with the longitudinal axis L of the cart 10. For instance, nonparallel orientations are achieved by providing in the first engagement member a receiving slot defining the elongated axis K', which when pivoted about point P, results in an angle Q. (See FIG. 2A.) Angle Q, for example, thus can be less than 60°, more particularly less than 50°, more particularly less than 40°, more particularly less than 30°, more particularly less than 20°, and more particularly less than 10°. The first receiving slot(s) 52 and the second receiving slot(s) 62 are accessible from the proximal end 22 of the frame 20. Generally, the present subject matter includes a wide array of arrangements and orientations of the first receiving slot and the second receiving slot, as well as both slots in combination with each other. The present subject matter includes the axis of the first receiving slot being nonparallel with the axis of the second receiving slot. The present subject matter also includes the axis of the first receiving slot being oriented parallel with the longitudinal axis of the cart. And the present subject matter includes the axis of the second receiving slot being oriented at an acute angle relative to the longitudinal axis of the cart.

Due to the orientation of slots 52 and 62 relative to frame 20, gravity assists in fixedly mounting machine 100 to frame 20, without requiring any additional latching mechanism, when axis L of frame 20 is substantially level with the ground (FIG. 2), as well as when the cart 10 is upended (FIG. 1) to move the machine 100. Due to the orientation of slots 52 and 62 relative to frame 20, this provides an ease-of-release feature.

In particular versions, the engagement provisions of the cart do not utilize any latch or latching type components or assemblies. Thus, in these versions, the engagement provisions are referred to as free of latches or "latch-free". However, as described herein, in other versions of the carts, one or more latches or positionable pin(s) can be utilized.

In certain versions, the engagement provisions are configured such that upon positioning and engaging a drain cleaning machine therein, the feet or ground-contacting members of the drain cleaning machine are free from contact with the cart and/or the frame of the cart. Instead, the drain cleaning machine is supported on the engagement provisions of the cart via the frame member(s) of the drain cleaning machine. Typically, such support is between the engagement provisions and one or more frame cross bars of the drain cleaning machine. However, it will be understood that the present subject matter also includes versions in which drain cleaning machines are supported on the cart using other configurations and including arrangements in which the feet of the drain cleaning machine contact the cart and/or its frame.

The transport carts of the present subject matter can be used with a wide array of drain cleaning machines. Non-limiting examples of such machines include sectional drain cleaning machines commercially available under the RIDGID designation such as for example models K-5208 and K-60SP. The present subject matter transport carts could also potentially be used with machines commercially available from other manufacturers and/or suppliers. It is also contemplated that the transport carts could be utilized with other types of drain cleaning machines such as but not limited to drum machines, rodder machines, water jetting machines, and FlexShaft machines.

It will be understood that by placing one or more drain cleaning machine frame components, for example the tubular frame of a drain cleaning machine such as the K-5208 sectional drain cleaner, into the slots of the engagement provisions, the machine and transport cart become connected and can be separated only through specific actions by the end user. The engagement provisions are thus configured to eliminate inadvertent separation during normal use or transport.

Further, in many embodiments, the carts of the present subject matter include one or more legs that support the cart when stood upright, thereby reducing the footprint during vehicular transport or storage of the cart. An example of such legs are depicted in FIG. 1. Specifically, the cart 10 includes a pair of legs 70 extending frontwardly from the distal end 24 of the frame 20. It will be understood that the present subject matter includes a wide variety of legs, leg configurations, and locations on the frame for affixing the one or more legs. It will also be understood that the leg(s) 70 may be integral with the frame 20 and/or the first engagement member(s) 50 as shown in the cart 10 of the referenced figures.

In many embodiments, the transport carts include a space or region along the frame for the end user to place drain cleaning accessories such as a sectional cable carrier(s) containing drain cleaning cable onto the cart. The cart can include one or more mounting arms for supporting and/or releasable retainment of such accessories or components on the cart. FIG. 1 illustrates a pair of mounting arms 80 extending frontwardly from the frame 20. The mounting arms 80 are typically located between the proximal end 22 of the frame 20 and the second engagement member(s) 60. However, the present subject matter includes other locations and configurations for the mounting arms 80. This feature allows the user to transport a sectional cable carrier system with the drain cleaning machine to the jobsite without making multiple trips, and may include the use of friction-reducing material on the surfaces of contact between the cable carrier and the cart and particularly the mounting arms for easier loading/unloading. Representative and nonlimiting examples of friction-reducing material including high density polyethylene (HDPE) and/or ultra high molecular weight polyethylene (UHMWPE).

Figure 3:
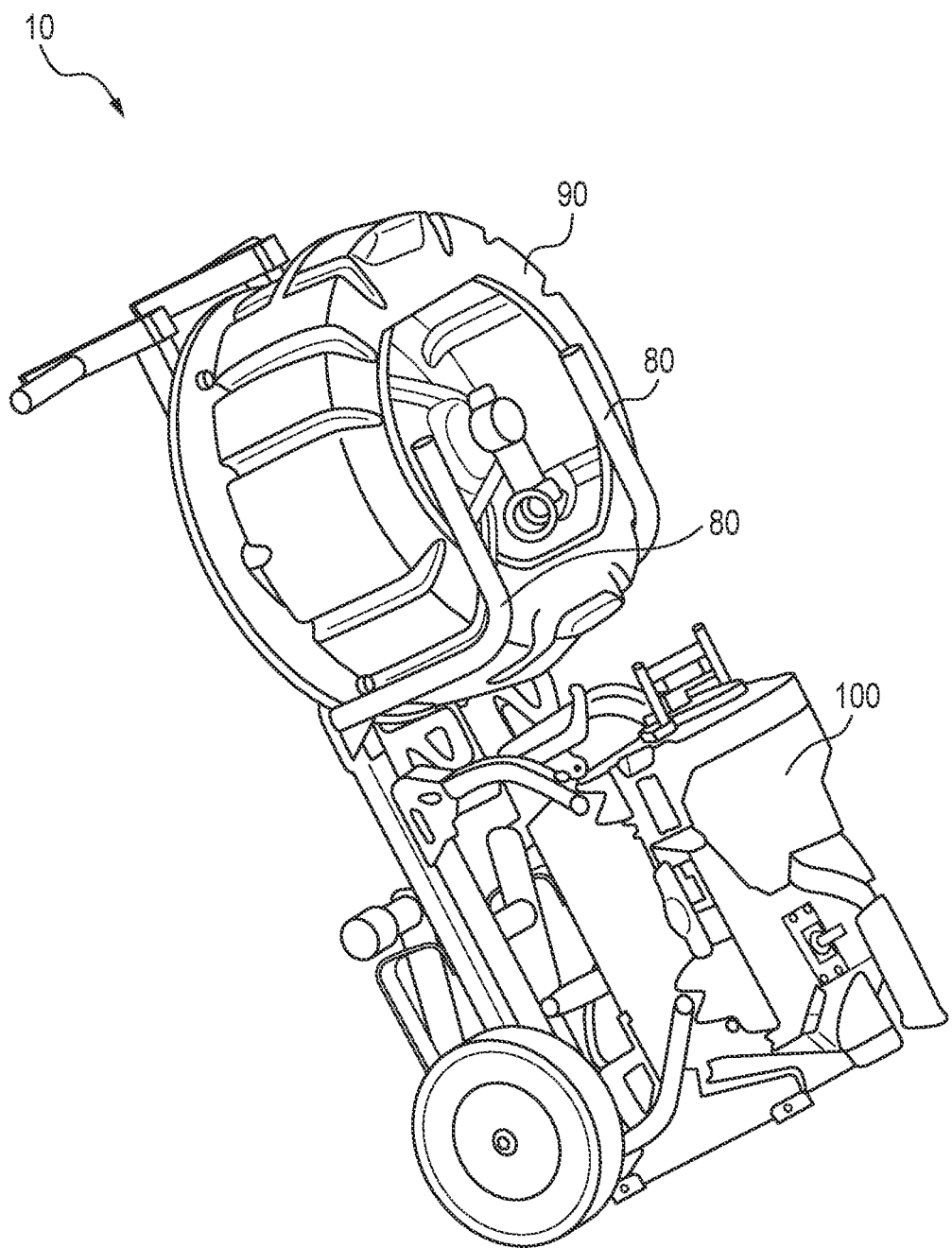
FIGS. 3 and 4 are front perspective views of the transport cart carrying various drain cleaning equipment in which the cart is in a transport position.
Figure 4:
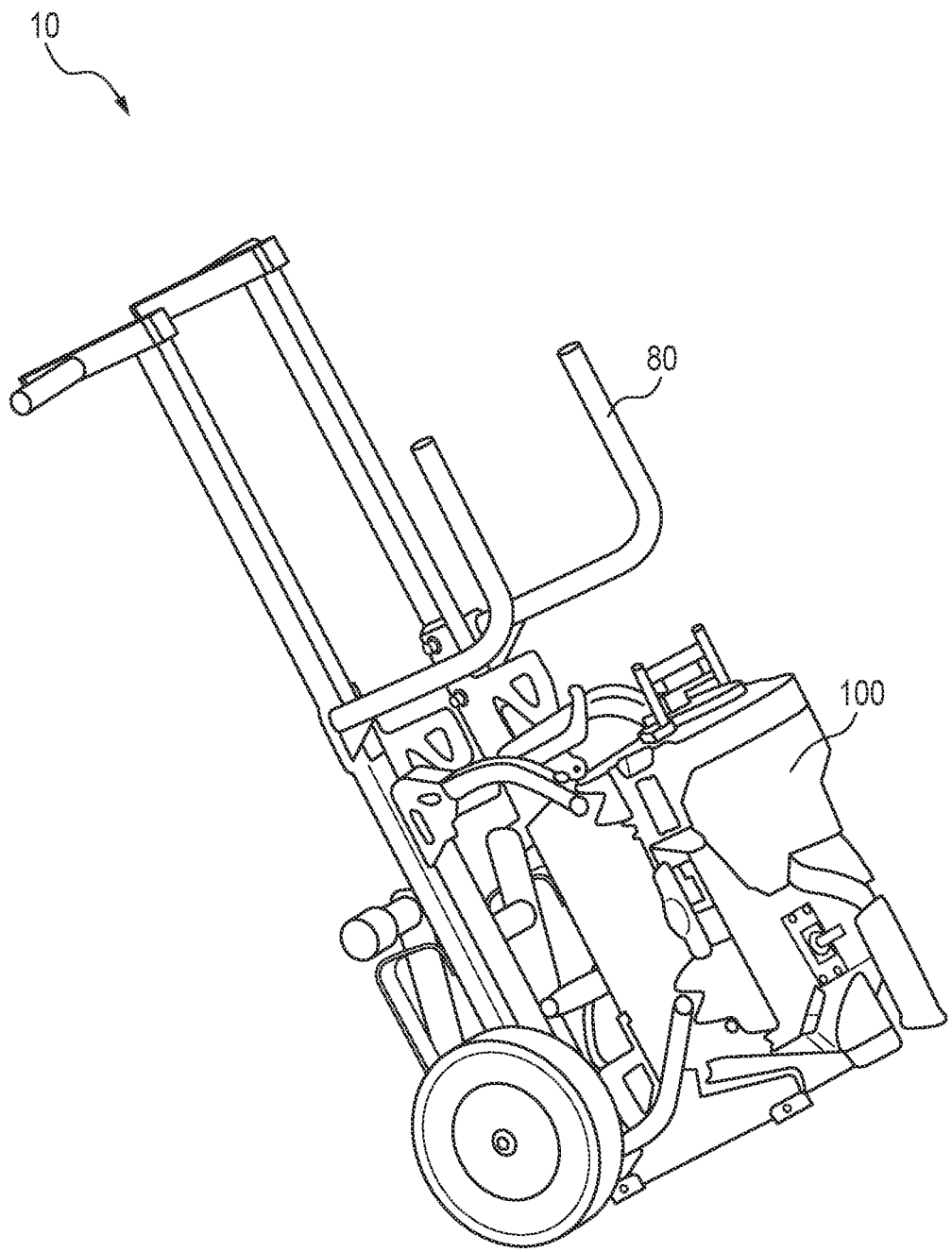

FIGS. 3 and 4 illustrate a transport cart in a transport position carrying various drain cleaning equipment. Specifically, FIG. 3 depicts a cable carrier 90 generally supported on the cart 10 by the mounting arms 80. FIG. 3 also shows a drain cleaning machine 100 releasably engaged with the cart 10 by the previously described engagement provisions. FIG. 4 shows the cart 10 and drain cleaning machine 100 without the noted cable carrier 90 of FIG. 3. In many versions of the cart 10, the cart and the mounting arms 80 are configured to hold and/or support a drum or cable carrier 90 in a vertical orientation such that upon placing the cart 10 in rest or storage position as depicted in FIG. 1, the plane of the cable carrier 90 extends vertically or substantially so.

Figure 5:
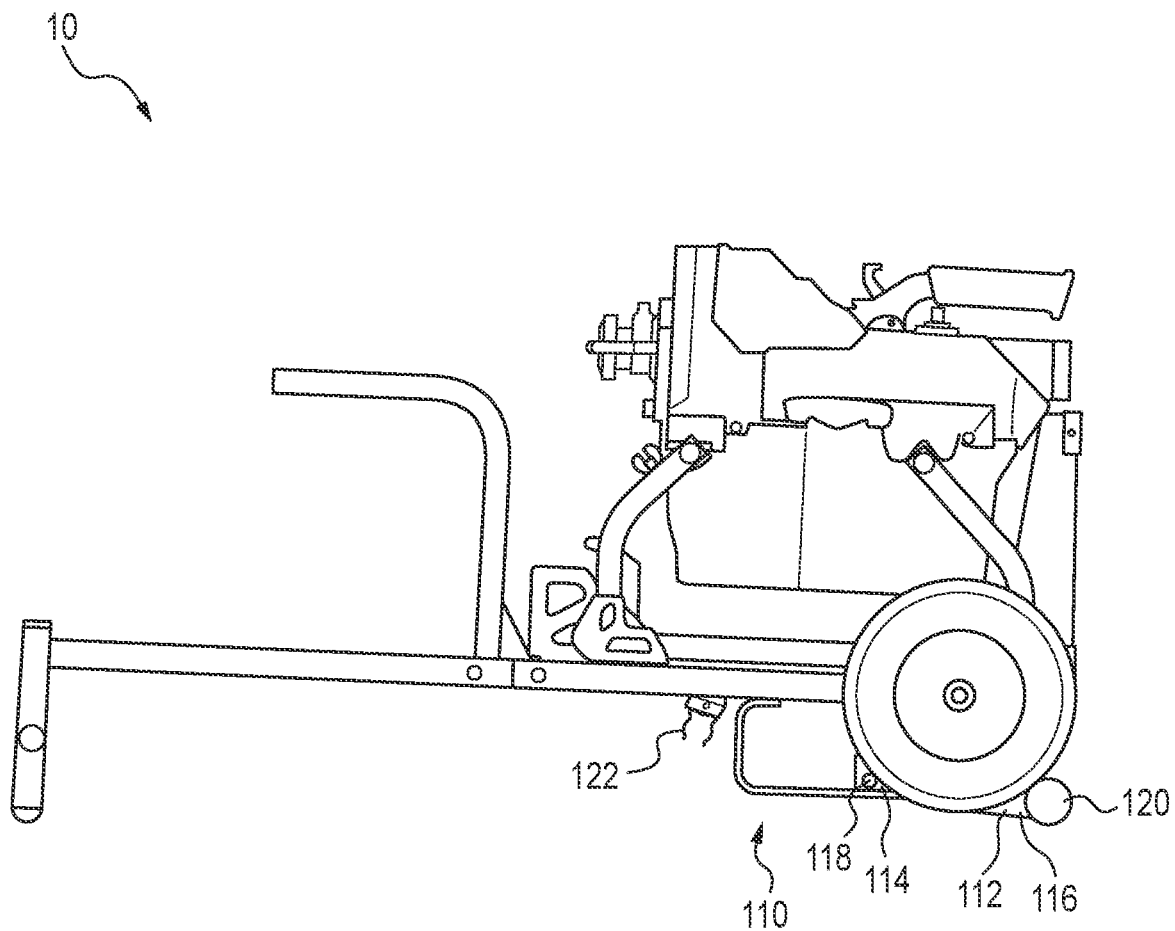
FIG. 5 is a side elevational view showing the transport cart with an optional kickstand in a use position.
Figure 6:
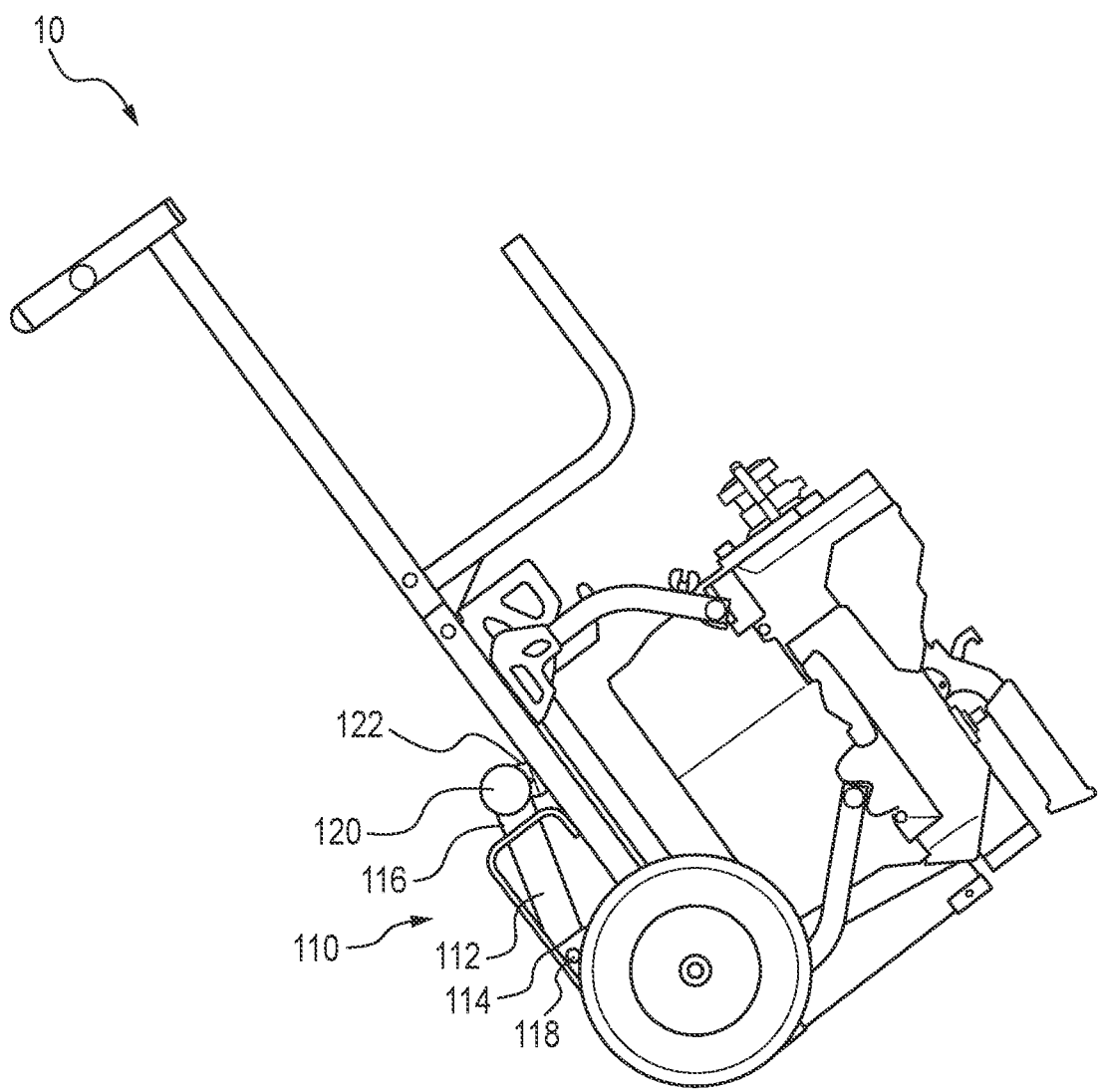
FIG. 6 illustrates the cart of FIG. 5 in a transport position.

In many embodiments, the transport carts include a kickstand assembly that keeps the unit stationary during use, thereby allowing the user to operate the machine while engaged with and positioned on the cart. The kickstand can be placed in a storage position whereupon the cart can be moved easily. Upon placing the kickstand in a storage position as shown in FIG. 6, the kickstand is retracted so as to extend generally along the frame of the cart so as to not interfere with wheeled transport of the cart and its contents. Upon placing the kickstand in a use position as shown in FIG. 5, the cart is positioned to rest upon an underlying surface or ground and the kickstand is extended from its storage position such that the kickstand supports the distal end of the cart. In this use position, typically the wheels of the cart are not in contact, i.e., free from contact, with the underlying surface or ground. A representative example of a kickstand assembly is shown in the referenced figures as kickstand assembly 110. The kickstand assembly 110 includes a kickstand member 112 having a proximal end 114 and an opposite distal end 116. The kickstand assembly 110 also includes a hinged base 118 at which is movably attached the proximal end 114 of the kickstand member 112. The kickstand assembly 110 also includes a chock 120 disposed at the distal end 116 of the kickstand member 112. In many versions, the kickstand assembly 110 also includes one or more retaining clip(s) 122 secured to the frame 20 for releasably holding the kickstand member 112 when placed in the storage position.

Figure 7:
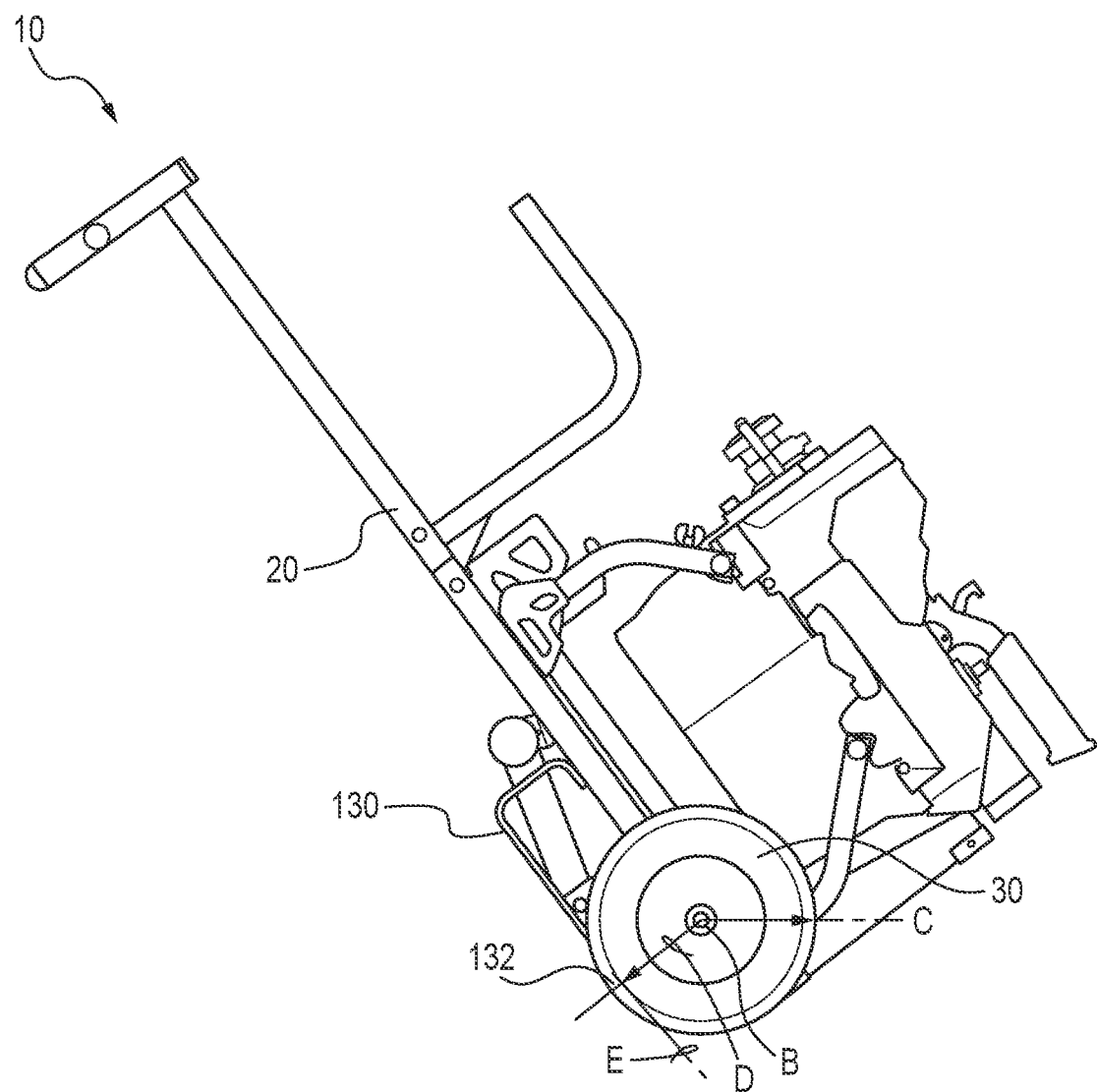
FIG. 7 is a side elevational view showing the transport cart with an optional stair support bracket.

In many embodiments, the transport carts include provisions that allow easy movement of the cart on stairs. By positioning one or more stair(s) support bracket(s) on the cart that extends tangential or nearly tangential to the wheel, the stairs support bracket can encounter and slidingly contact the stairs, providing smooth and flat surface engagement to the stair surface. The term "tangential or nearly tangential to the wheel" refers to the location and orientation of the stairs support bracket relative to an outer perimeter of a corresponding wheel of the cart viewed along a line parallel to the axis of rotation of the wheel. "Nearly tangential to the wheel" includes locations and orientations of the stairs support bracket which are not exactly tangential to the outer perimeter of the noted wheel, but within a range of from 90% to 100%, and most particularly within a range of from 95% to 100%, of the radial distance of that wheel. Low friction or friction-reducing material can be used at the interface between stairs and the stairs support bracket to further reduce required effort to move up or down stairs. An example of such provisions are shown in FIG. 7. Specifically, FIG. 7 illustrates a stairs support bracket 130 extending rearwardly from the frame 20 of the cart 10. The stairs support bracket 130 generally extends along an axis E. As will be understood, the wheel 30 has a radius distance C as taken from a center of the wheel shown as B. In the particular configuration depicted in FIG. 7, the stairs support bracket 130 is located and/or oriented such that the bracket 130 is not tangential to the wheel 30, but rather intersects the wheel radius at 132, to thereby define radial distance D. The location and/or orientation of the stairs support bracket 130 is such that radial distance D is within a range of from 90% to 100% of the wheel radius distance C, and more particularly, within a range of from 95% to 100% of C. The present subject matter is not limited to these particular locations and/or orientations of the stairs support bracket 130.

Figure 8:
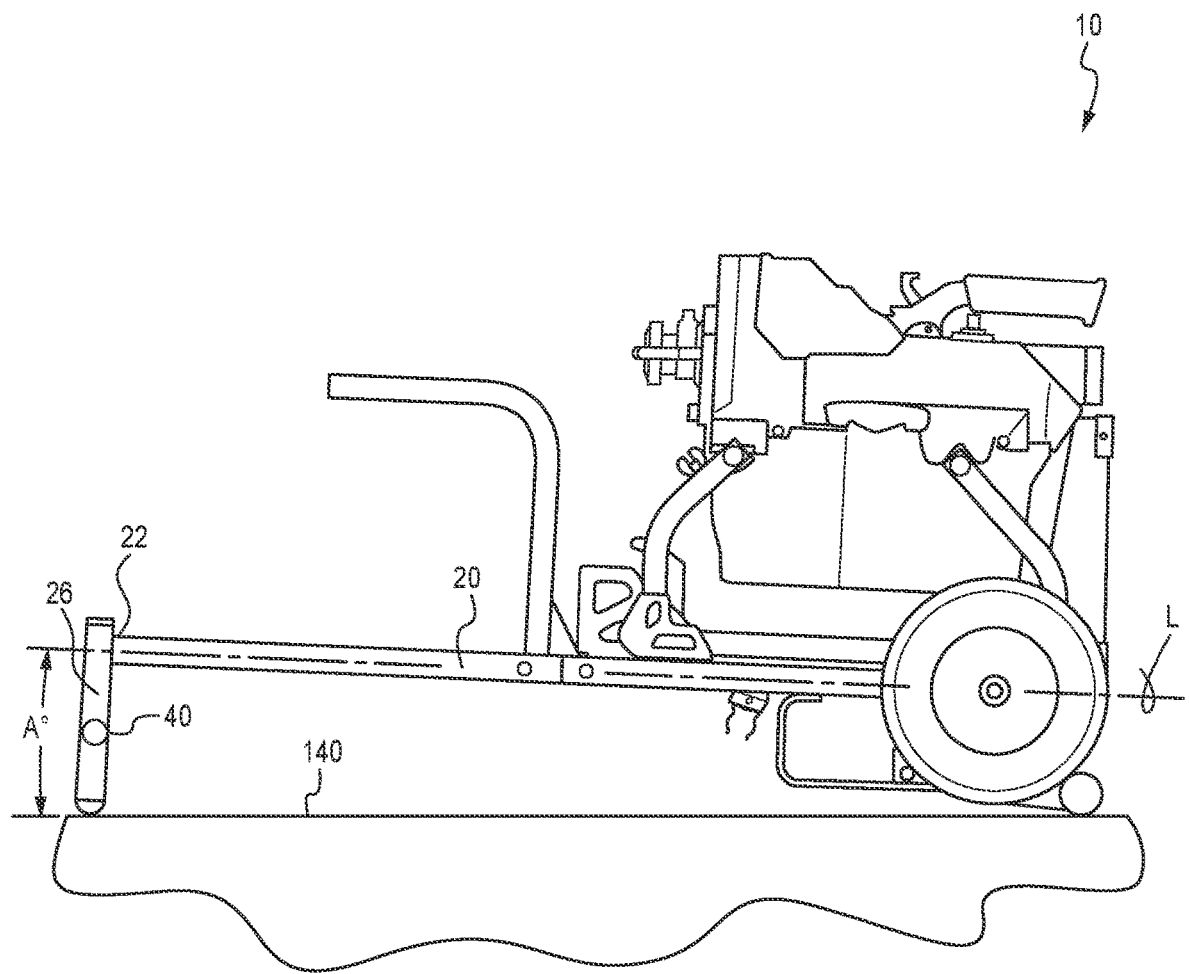
FIG. 8 is a side elevational view illustrating another feature of the transport cart.

In certain embodiments, the cart is configured such that the frame rests at an angle nonparallel to the underlying surface when the cart is laid down or placed in a generally horizontal position. This configuration better holds the drain cleaning machine, and drain cleaning cable if present, in place on the cart during rest or transit of the assembly. Referring to FIG. 8, the cart 10 is shown resting on a ground or floor surface 140. The frame 20 extends along the previously noted frame longitudinal axis L. In this version, the frame 20 includes one or more rearwardly extending floor supports 26 generally located at the proximal end 22 of the frame 20. The previously noted handle(s) 40 can be incorporated with the floor support 26. The floor supports 26 are located and/or configured such that when the cart is placed in the position shown in FIG. 8, i.e., resting on floor surface 140, the longitudinal axis L of the frame 20 is nonparallel with the floor surface 140, and extends at an angle A. Angle A is typically within a range of from 1° to 10°, and in certain versions from 2° to 5°. However, it will be understood that the present subject matter is not limited to these particular orientations.

A significant advantage of the present subject matter is the efficiency gained by the end user due to the improved transportability of the drain cleaning machine with flexibility to quickly connect or disconnect the machine from the wheeled transport cart when the jobsite space constraints are inadequate for a large footprint. The ease by which this is accomplished results in improved time efficiency of use.

Allowing the transport of drain cleaning cable with a drain cleaning machine further improves the efficiency gained by the operator by reducing the effort and/or number of trips required to set up the equipment at the jobsite. Similarly, the kickstand improves the efficiency to the end user by allowing effective machine usage when the drain cleaning machine is coupled to the transport cart, thereby eliminating the need to remove the machine from the cart if the not necessary otherwise.

Figure 9:
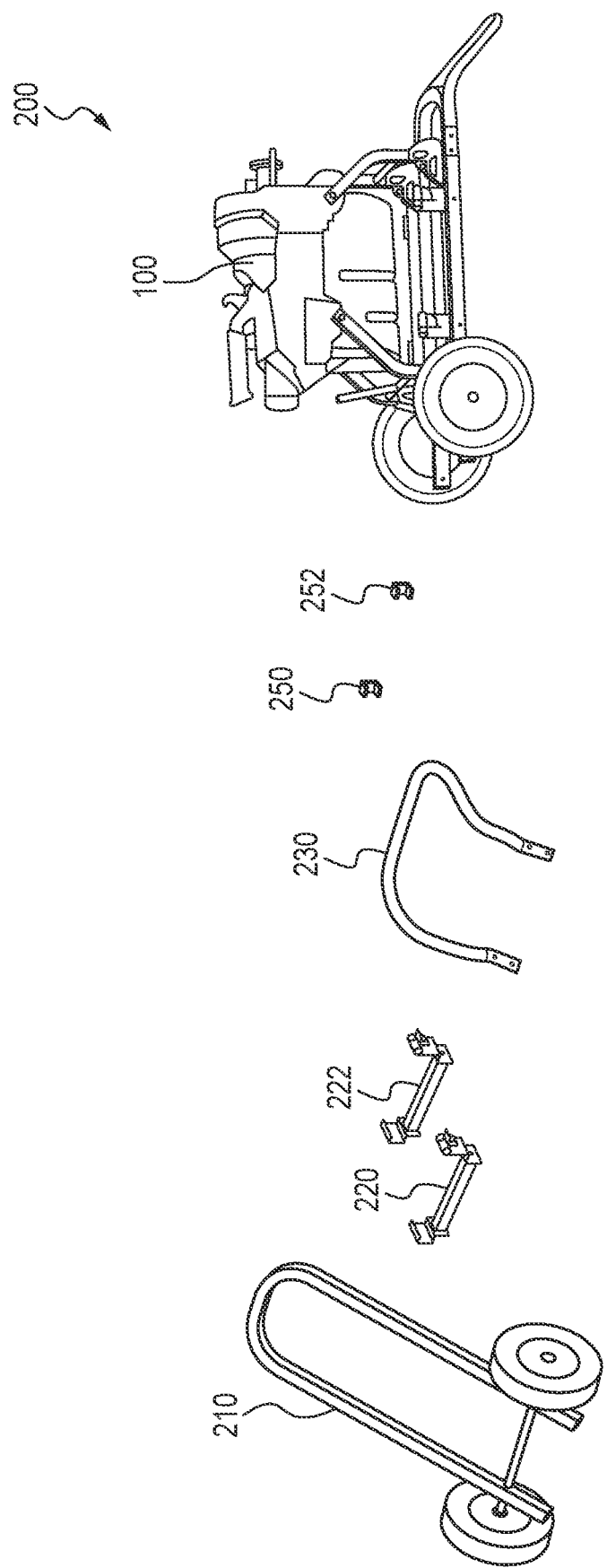
FIG. 9 is a schematic exploded assembly view of another embodiment of a transport cart in a first configuration in accordance with the present subject matter.
Figure 10:
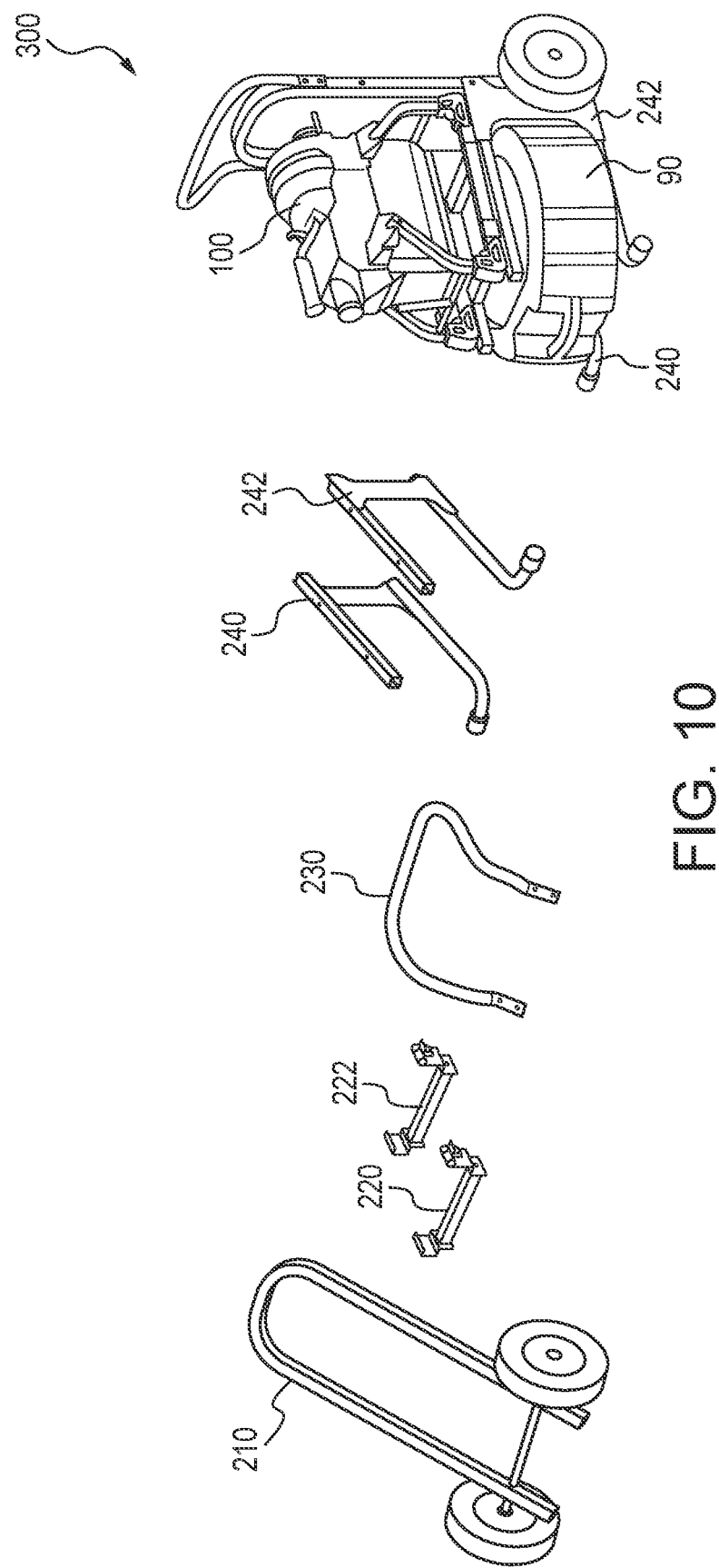
FIG. 10 is a schematic exploded assembly view of the transport cart of FIG. 9 in a second configuration in accordance with the present subject matter.

The present subject matter also provides several alternative cart embodiments for quickly attaching or removing a drain cleaner from a transport cart. For example, in certain versions, a transport cart is provided that achieves various operational transport cart configurations via a set of components that can be rearranged depending on the specific demands of the end user or the jobsite environment. By positioning the components in an alternate manner, a different configuration is achieved. FIGS. 9 and 10 illustrate two alternate cart and component configurations.

In this embodiment, a base frame 210, cross members 220, 222, and a handle loop 230 are common to both a lower (B-frame style) transport cart 200 and a taller (A-frame style) transport cart 300. The lower transport cart 200 receives additional bumpers 250, 252 to rest on the ground when the unit is stationary whereas the taller transport cart 300 receives unique leg weldments 240, 242 to complete the structure for standing upright at rest. These smaller, simpler differences allow a very efficient means of converting one transport cart configuration to the other with a minimal amount of effort or custom parts required.

The transport carts can further be configured to carry a container, for example the drum 90, of drain cleaning cables in addition to a base drain cleaning machine such as the machine 100, shown in FIG. 10.

To allow some end users the flexibility to use a base drain cleaning machine without the footprint of the transport cart at the jobsite, the present subject matter further provides a quick connection and disconnection for attaching the drain cleaning equipment to the cart. This can be achieved by various provisions, and methods, as described herein.

Figure 11:
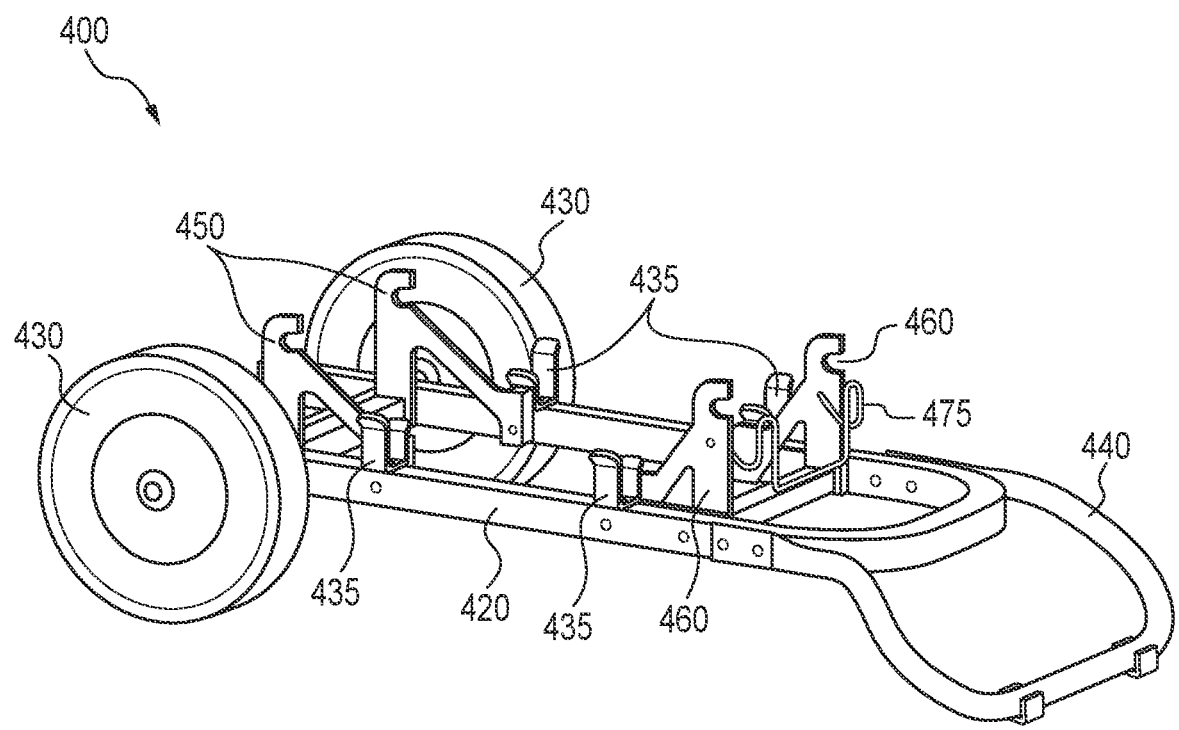
FIG. 11 further illustrates another embodiment of a transport cart in accordance with the present subject matter.

By having side locating tabs on the transport cart, an operator can first easily lower the separated drain cleaning machine onto the transport cart and locate the unit laterally. First and second locating tabs, then, allow the user to efficiently locate the machine longitudinally. A user pushes the machine until the first locating tab engages the structure of the drain cleaning machine. A single latch pin, then holds the unit in place. This is depicted in FIG. 11. Specifically, FIG. 11 illustrates another transport cart 400 in accordance with the present subject matter. The cart 400 generally includes a frame 420 with wheels 430 rotatably supported thereon. The cart 400 also comprises the noted side locating tabs 435 extending frontwardly from the frame 420. The cart 400 also comprises one or more first locating tab(s) 450 proximate the wheels 430, and one or more second locating tab(s) 460 located between the first tabs 435 and a handle 440. After engaging a drain cleaning machine 100 in the various tabs 435, 450, and 460, a movable latch pin 475 is positioned to thereby releasably engage the drain cleaning machine 100 (not shown in FIG. 11) on or with the cart 400.

Figure 12:
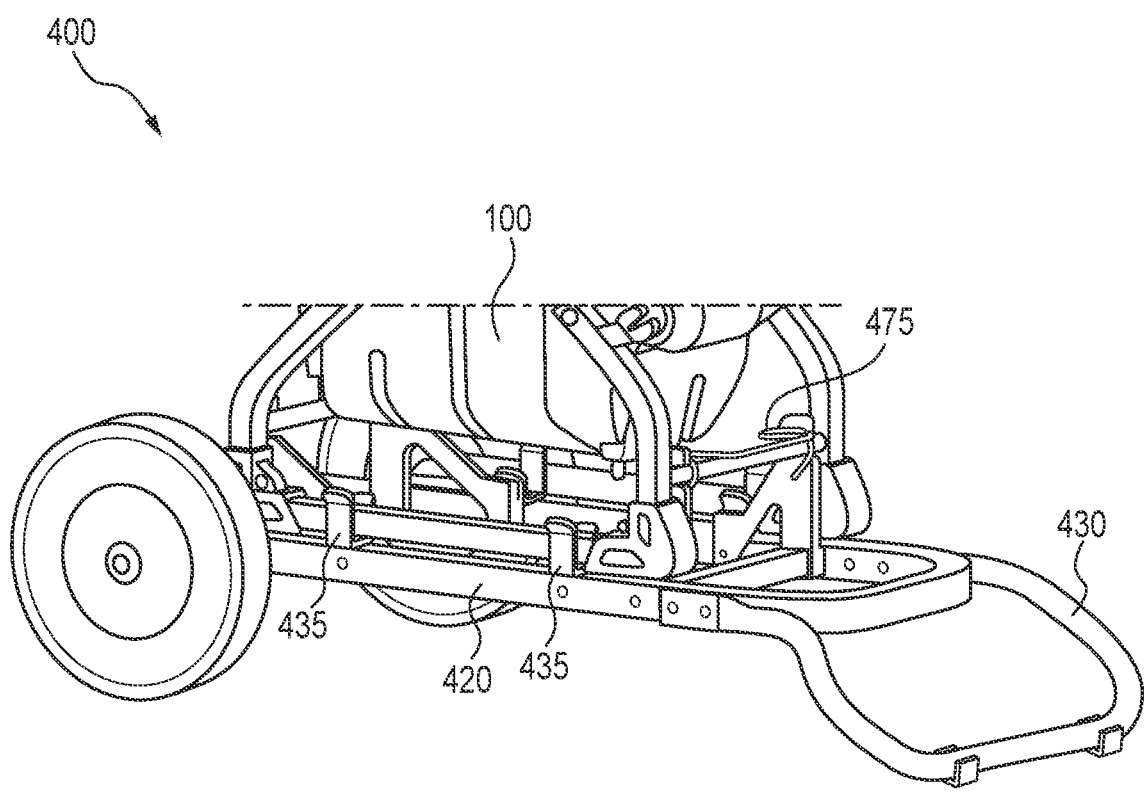
FIG. 12 illustrates the transport cart of FIG. 11 supporting and engaged with a drain cleaning machine in accordance with the present subject matter.

Specifically, after the drain cleaning machine 100 is placed onto the transport cart 400 and moved into proper position by locating at the first locating tab 460, the latch pin 475 can be rotated to engage the machine structure and apply appropriate force to lock the drain cleaning machine 100 onto the transport cart 400. This is shown in FIG. 12.

The carts of the present subject matter may optionally include a plurality of latching pins, located on the cart exclusively at one end of the machine or positioned at both ends of the machine, to hold the machine to the transport cart. Alternatively or in addition, flexible straps could be used in place of, or in combination with, the latching pin(s) to hold the unit rigidly to the transport cart structure by stretching across the side rails or end cross-members of the machine frame to properly hold the drain cleaning machine in place. Similarly, the front and rear locking tabs may be positioned to locate and hold the unit laterally, thereby eliminating the need for the side locating tabs.

Figure 13:
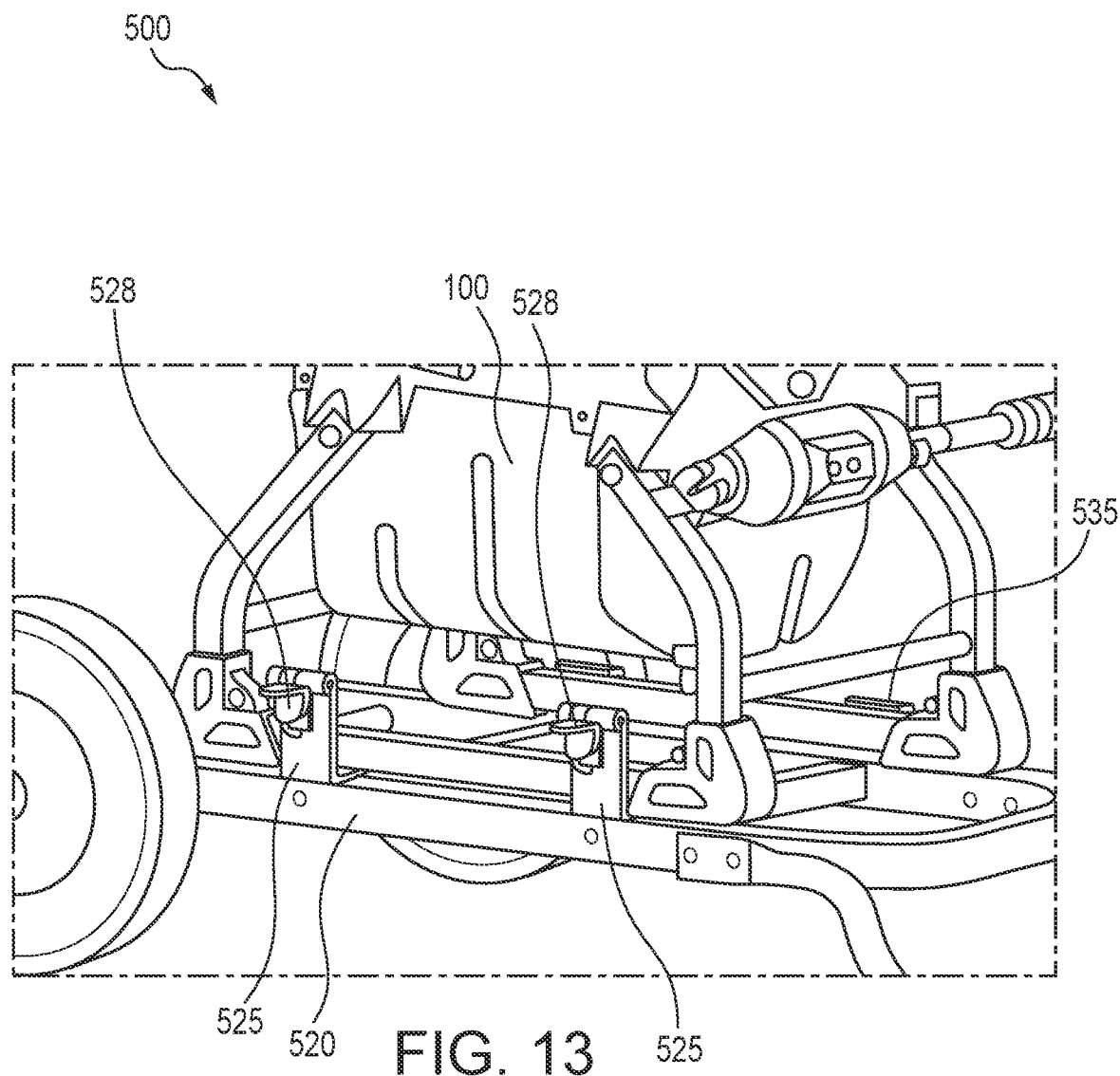
FIGS. 13 and 14 illustrate a transport cart utilizing an alternate assembly for engaging the drain cleaning machine thereto.
Figure 14:
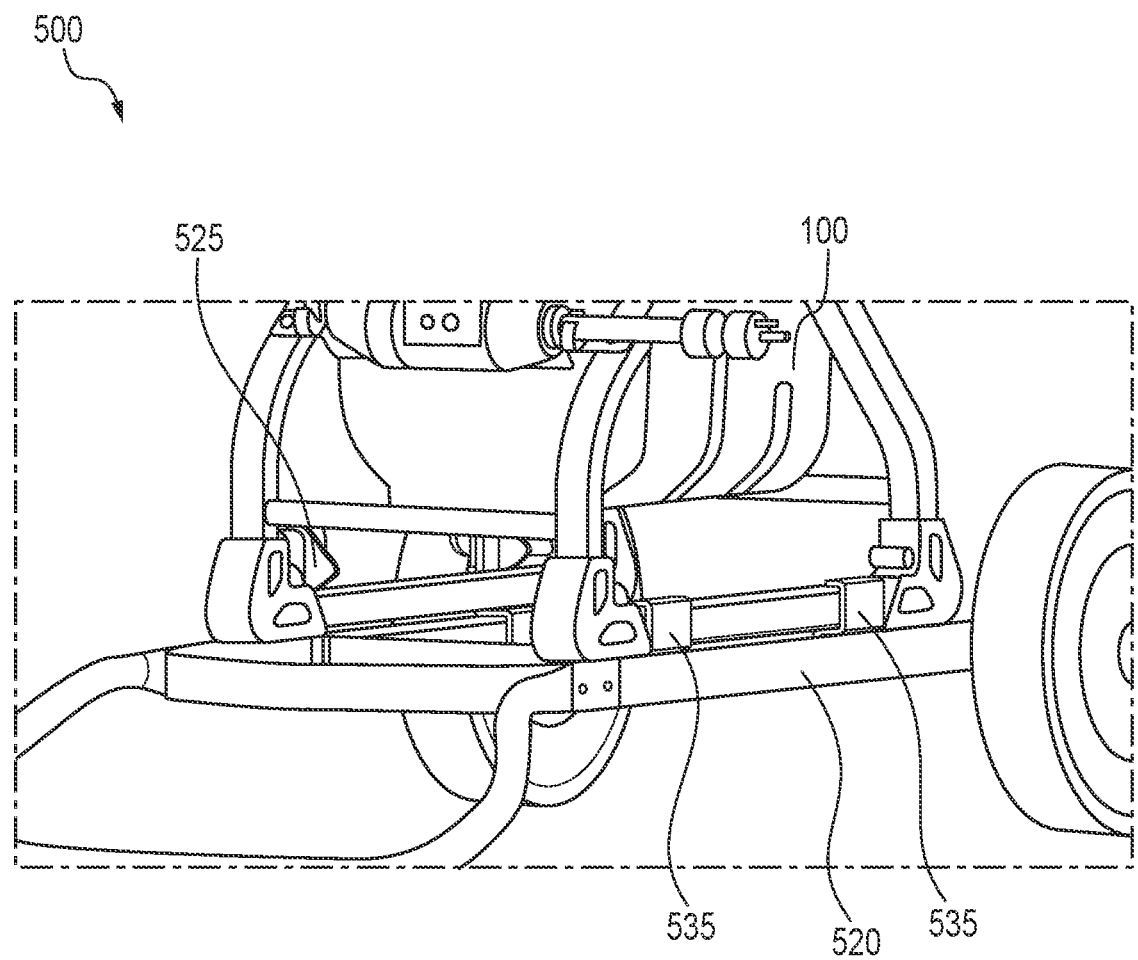

Affixment or retainment of a drain cleaning machine to the cart could be similarly achieved through spring-loaded pivoting tabs that overlap the primary machine structure to hold the drain cleaning unit in place on the transport cart. In this manner, the operator would first lower the machine and insert one half of the unit into stationary tabs on the transport cart to hold that side of the machine in place. The end user would then secondly rotate the unit to allow the opposite side of the machine to engage spring-loaded pivoting lock tabs that rotate when contacted by the machine structure, but are spring-biased to return and capture the unit. When disconnecting, the operator would manually unlock the spring-loaded pivoting lock tabs and lift the unit off the transport cart. This configuration is depicted in FIGS. 13 and 14. Specifically, FIGS. 13 and 14 illustrate a cart 500 supporting a drain cleaning machine 100. The cart 500 includes a frame 520 having a first set of supports 525 located along one side of the frame and a second set of supports 535 located along another side of the frame. Provided in association with the first set of supports 525 are corresponding spring-loaded pivoting tabs 528, as noted.

The present subject matter could likewise utilize vertical pins in the transport cart that align with holes or slots in the structure of the machine when installed. In this manner, the operator would first lower the machine onto the transport cart in a way such that the alignment pins of the transport cart engage the hole/slot in the machine, ensuring that the machine is in the correct position for mounting. This alignment, then, would utilize similar latching mechanisms as described herein to fully constrain the machine to the transport cart for transportation and/or use.

The present subject matter further provides the same or similar latching variation via singular or multiple attachment points between the drain cleaning equipment and transport cart. Likewise, the present subject matter also provides similar over-center latch mechanism(s) that provide sufficient holding force to lock the machine onto the transport cart for wheeled movement and/or drain cleaning operation.

Figure 15:
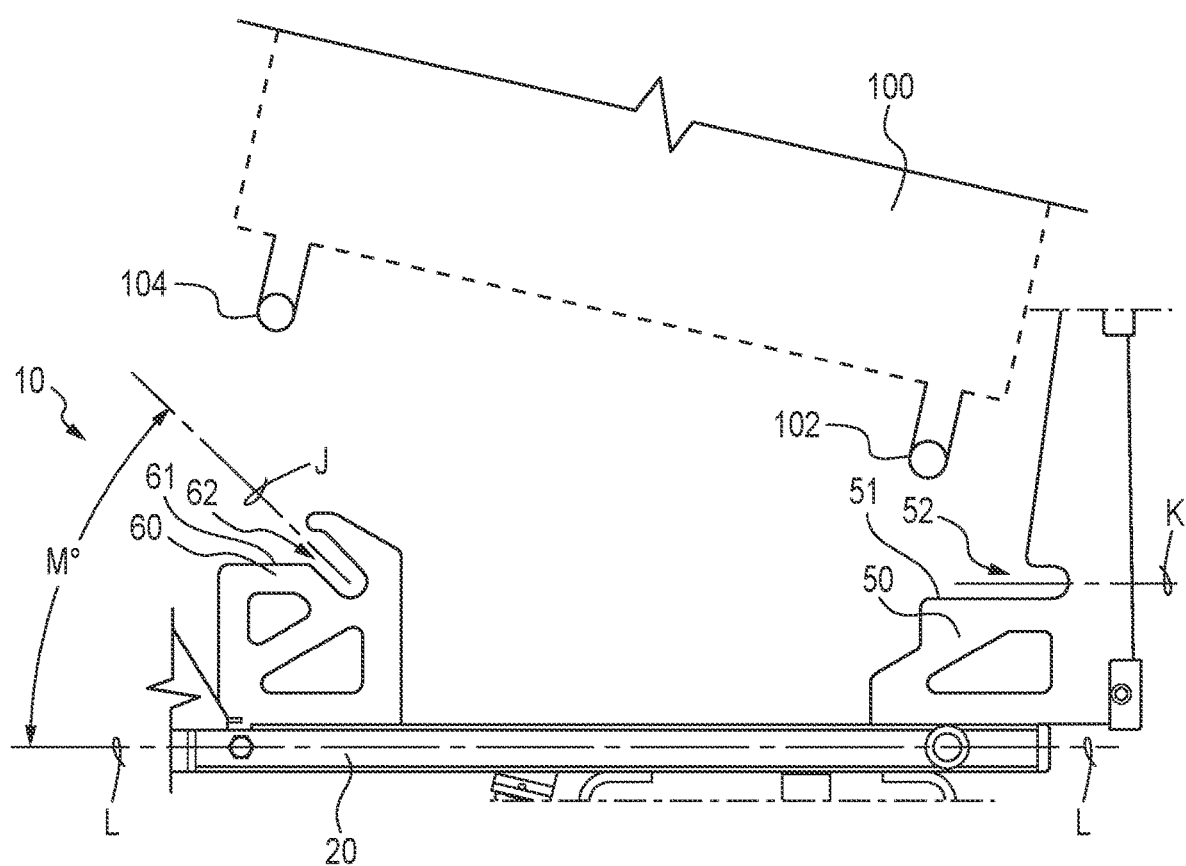
FIG. 15 schematically illustrates engagement of a drain cleaning machine with the transport cart of FIG. 1.

FIG. 15 schematically depicts engagement of the drain cleaning machine 100 with the transport cart 10. The drain cleaning machine 100 includes a first retention component(s) 102 and a second retention component(s) 104. The first retention component 102 can include a plurality of retention components such as a pair of first retention components. The second retention component 104 can include a plurality of retention components such as a pair of second retention components. FIG. 15 further illustrates engagement between the drain cleaning machine 100 and the cart 10 by positioning the first retention component 102 within the first receiving slot 52, and positioning the second retention component 104 within the second receiving slot 62. The first retention component 102 is sized and shaped to be received within the first receiving slot 52; and/or the first receiving slot 52 is sized and shaped to receive the first retention component 102. The second retention component 104 is sized and shaped to be received within the second receiving slot 62; and/or the second receiving slot 62 is sized and shaped to receive the second retention component 104.

In many versions, the engagement members 50, 60 include landing faces or regions upon which the retention components 102, 104 can be positioned, slid or otherwise moved toward the receiving slots 52, 62. For example, prior to engaging the drain cleaning machine 100 with the transport cart 10, the first retention component 102 is placed upon and/or in contact with a first landing face 51 defined along the first engagement member 50 and adjacent the first receiving slot 52. Before, after, or concurrently with such placement or contact of the first retention component 102, the second retention component 104 is placed upon and/or in contact with a second landing face 61 defined along the second engagement member 60 and adjacent the second receiving slot 62. As will be understood, the landing faces 51, 61 promote sliding contact between the retention components 102, 104 and the engagement members 50, 60.

A significant advantage of the present subject matter carts utilizing interchangeable components is the efficiency gained in forecasting, planning, building, and stocking the components and end product to produce a transport cart. With the modularity of this transport cart platform, there is reduced complexity resulting in greater satisfaction in product manufacture and lower risk of delivery errors. For the end user, this provides greater flexibility in configuring the drain cleaning machine system to meet the requirements of the specific user or exact application environment with a minimal amount of required effort. The reduced manufacturing and stocking complexity results in optimized order fulfillment, allowing the end user to have the desired product in-hand more quickly and resulting in efficient usage in a shorter amount of time.

The quick connection and disconnection feature provides improved transportability of the drain cleaning machine with additional flexibility to remove the machine from the wheeled cart when the jobsite space constraints are inadequate for a large footprint. The ease at which this is accomplished results in improved time efficiency of use.

Although the present subject matter transport carts have been described in association with drain cleaning equipment, it will be understood that the present subject matter is not limited to such. Instead, the carts can be used to transport and/or support a wide array of equipment and machines besides drain cleaning devices.

The present subject matter also provides various methods using the carts described herein. In particular, the methods relate to transporting a drain cleaning machine. For example, the method comprises providing a transport cart including (a) a frame defining a proximal end and an opposite distal end, the frame defining a longitudinal axis extending between the proximal end and the distal end, the frame including a pair of wheels rotatably secured to the frame adjacent the distal end, and (b) engagement provisions secured to the frame. The engagement provisions include (i) a first member adjacent the distal end of the frame defining a first receiving slot having an axis oriented parallel with the longitudinal axis of the cart, and (ii) a second member between the proximal end of the frame and the first member. The second member defines a second receiving slot having an axis oriented at an acute angle to the longitudinal axis of the cart, wherein both of the first receiving slot and the second receiving slot are accessible from the proximal end of the frame. This method also involves aligning a first portion of a frame of the drain cleaning machine with the first receiving slot, and then aligning a second portion of the frame of the drain cleaning machine with the second receiving slot. Next, the drain cleaning machine is moved relative to the cart such that the frame of the drain cleaning machine is positioned in both of the first receiving slot and the second receiving slot. This results in secure yet releasable engagement of the drain cleaning machine to the cart.

In certain techniques, in the previously described method the moving operation simultaneously positions the frame of the drain cleaning machine into both of the first receiving slot and the second receiving slot.

The present subject matter also provides various systems using the noted transport carts. For example, in one embodiment, a system comprises a drain cleaning machine, and a transport cart including a frame defining a proximal end and an opposite distal end. The frame defines a longitudinal axis extending between the proximal end and the distal end, the frame including a pair of wheels rotatably secured to the frame adjacent the distal end, and engagement provisions secured to the frame. The engagement provisions include (i) a first member adjacent the distal end of the frame defining a first receiving slot having an axis oriented parallel with the longitudinal axis of the cart, and (ii) a second member between the proximal end of the frame and the first member. The second member defines a second receiving slot having an axis oriented at an acute angle to the longitudinal axis of the cart, wherein both of the first receiving slot and the second receiving slot are accessible from the proximal end of the frame.

In another embodiment, a system comprises a drain cleaning machine, and a transport cart including a frame defining a proximal end and an opposite distal end. The frame defines a longitudinal axis extending between the proximal end and the distal end. The frame includes a pair of wheels rotatably secured to the frame adjacent the distal end, and a kickstand assembly secured to the frame. The kickstand assembly includes a kickstand positionable between a storage position and a use position, wherein upon orienting the frame to rest upon an underlying surface, and positioning the kickstand to the use position, the pair of wheels are free from contact with the underlying surface.

In another embodiment, a system comprises a drain cleaning machine, and a transport cart. The transport cart includes a frame defining a proximal end and an opposite distal end. The frame defines a longitudinal axis extending between the proximal end and the distal end. The frame includes a pair of wheels rotatably secured to the frame adjacent the distal end. The transport cart also includes a stairs support bracket secured to the frame and positioned such that the bracket extends tangential or nearly tangential to at least one wheel of the pair of wheels.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A transport cart (10) for transporting machinery or equipment (100), wherein the transport cart (10) comprises:
   a frame (20) defining a proximal end (22) and an opposite distal end (24), wherein the frame (20) defines a frame longitudinal axis (L) extending between the proximal end (22) and the distal end (24), and wherein the frame (20) includes at least one wheel (30) rotatably secured to the frame (20) adjacent the distal end (24);
   a first planar engagement member (50) located adjacent the distal end (24) of the frame (20), wherein the first engagement member (50) includes a first receiving slot (52) defining a first longitudinal axis (K or K'), and
   a second planar engagement member (60) located between the proximal end (22) of the frame (20) and the first planar engagement member (50), wherein the second planar engagement member (60) includes a second receiving slot (62) defining a second longitudinal axis (J), wherein the second receiving slot (62) is accessible from the proximal (22) end of the frame (20), and wherein the second longitudinal axis (J) is inclined relative to the frame longitudinal axis (L) such that a first portion (104) of the machinery or equipment (100) is insertable into the second receiving slot (62) and held therein by gravity;
   wherein the first longitudinal axis (K or K') is parallel with the frame longitudinal axis (L).

2. The transport cart (10) of claim 1 wherein the first receiving slot (52) and the second receiving slot (62) are both accessible from the proximal (22) end of the frame (20).

3. The transport cart (10) of claim 1 including at least one handle (40) secured to the frame (20) adjacent the proximal end (22) of the frame (20).

4. The transport cart (10) of claim 1 wherein the first planar engagement member (50) and the second planar engagement member (60) are both latch-free.

5. The transport cart (10) of claim 1 further comprising:
   at least one floor support (26) extending rearwardly from the frame (20) such that upon resting the cart (10) on a floor surface, the frame (20) longitudinal axis (L) is nonparallel to the floor surface.

6. The transport cart (10) of claim 5 wherein the axis (J) of the second receiving slot (62) is oriented at an acute angle to the longitudinal axis (L) of the frame (20).

7. The transport cart (10) of claim 5 further comprising:
   a kickstand assembly (110) secured to the frame (20), the kickstand assembly (110) including a kickstand (112) positionable between a storage position and a use position, wherein upon orienting the frame (20) to rest upon an underlying surface, and positioning the kickstand (112) to the use position, the at least one wheel (30) is free from contact with the underlying surface.

8. The transport cart (10) of claim 5 further comprising:
   at least one handle (40) secured to the frame (20) adjacent the proximal end (22) of the frame (20).

9. The transport cart (10) of claim 5 further comprising:
   at least one leg (70) extending from the frame (20).

10. The transport cart of claim 5 further comprising:
    at least one mounting arm (80) extending from the frame (20).

11. The transport cart (10) of claim 5 wherein the first planar engagement member (50) and the second planar engagement member (60) are both latch-free.

12. The transport cart (10) of claim 1 wherein the axis (K or K') of the first receiving slot (52) is nonparallel with the axis (J) of the second receiving slot (62).

13. The transport cart (10) of claim 1 wherein the axis (J) of the second receiving slot (62) is oriented at an acute angle to the longitudinal axis (L) of the frame (20).

14. The transport cart (10) of claim 1 further comprising:
    a kickstand assembly (110) secured to the frame (20), the kickstand assembly (110) including a kickstand (112) positionable between a storage position and a use position, wherein upon orienting the frame (20) to rest upon an underlying surface, and positioning the kickstand (112) to the use position, the at least one wheel (30) is free from contact with the underlying surface.

15. The transport cart (10) of claim 1 further comprising:
    at least one leg (70) extending from the frame (20).

16. The transport cart (10) of claim 1 further comprising:
    at least one mounting arm (80) extending from the frame (20).

\* \* \* \* \*